April 13, 1965     J. A. STEIN     3,178,549
BRAZING METHOD AND MEANS
Filed Jan. 11, 1963     2 Sheets-Sheet 2
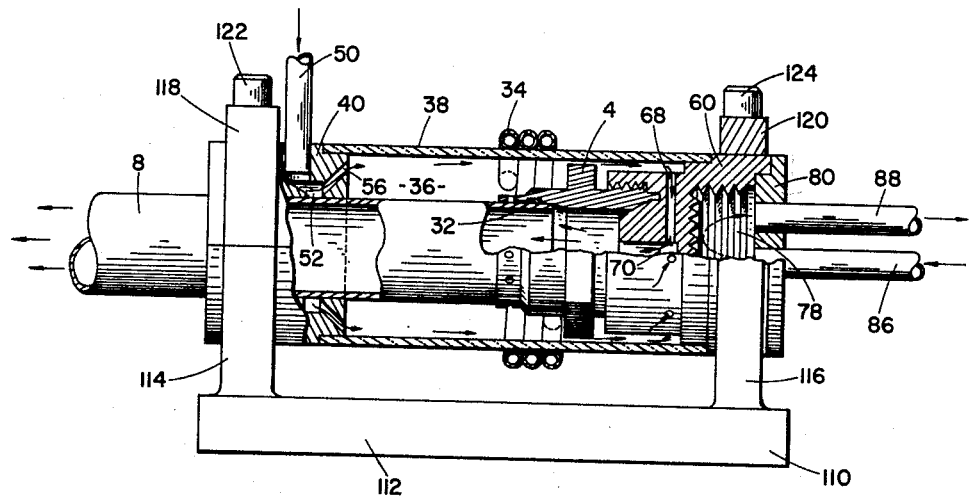
FIG. 4
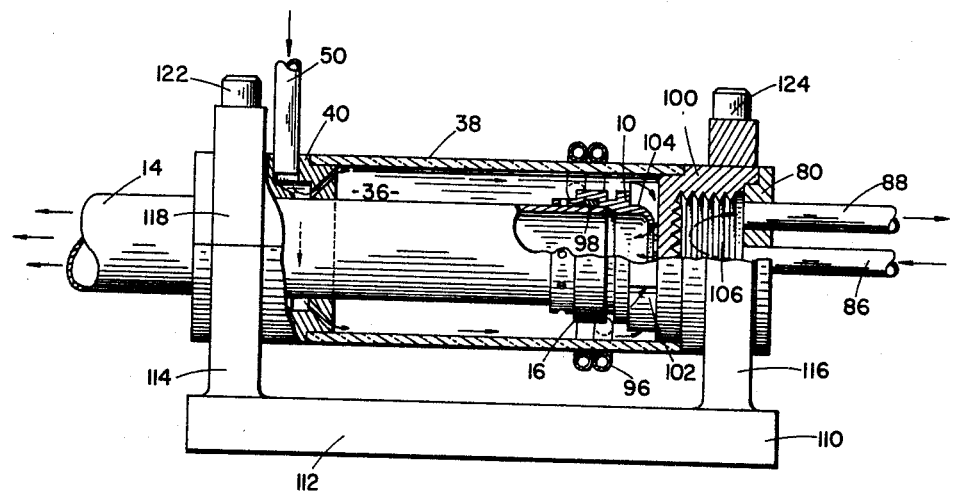
FIG. 5
INVENTOR.
JOHN A. STEIN
BY
ATTORNEY

United States Patent Office 3,178,549
Patented Apr. 13, 1965

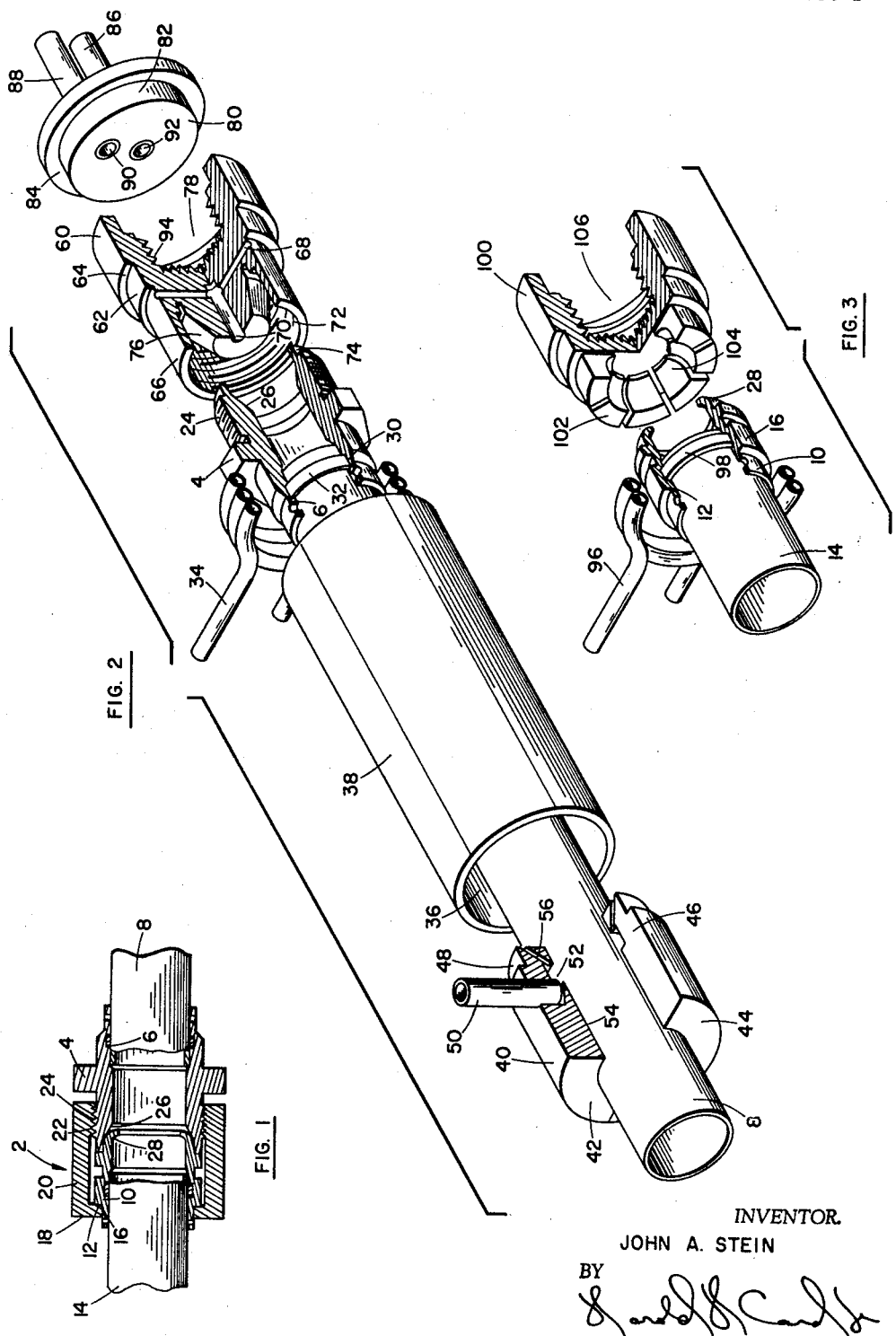

3,178,549
BRAZING METHOD AND MEANS
John A. Stein, Torrance, Calif., assignor to
North American Aviation, Inc.
Filed Jan. 11, 1963, Ser. No. 250,930
5 Claims. (Cl. 219—9.5)

This invention relates to method and means for applying heat to a workpiece as required for various manufacturing or repairing operations thereon, including localized heat treatment of parts, and the formation of brazed conduit joints and connections. More particularly, the invention contemplates improved method and means for applying heat in localized areas on workpieces of thin-walled or otherwise heat-sensitive nature such as required for brazing joint or coupling components on relatively thin steel tubing.

Although the inventive teachings disclosed herein are of wide applicability in forming a variety of diverse joints or connections between elements of different forms and materials for various purposes, the invention will be described for the sake of illustration in connection with high-strength tubes or conduits used in environments characterized by severe temperature and pressure requirements. It will be understood that the scope of the inventive concept is not limited by any of the specific details used to explain the invention, except as determined by reference to the accompanying claims.

Tubes and conduits such as required for hydraulic lines or other fluid systems involving severe weight penalties are often formed in separate sections which are joined or coupled together at the abutting ends thereof. The design of coupling components in systems of the stated type requires that the items comprising such couplings be precision formed of high-strength materials of the lightest possible weight. Notable among the various suitable materials are the so called advanced alloys of precipitation hardenable stainless steel, of which the alloy designated as AM355 stainless steel is illustrative. The component elements and general range of percentage composition for AM355 stainless steel are as follows:

| | |
|---|---|
| Carbon | 0.10–0.15 percent. |
| Manganese | 0.50–1.25 percent. |
| Silicone | 0.50 percent maximum. |
| Phosphorous | 0.04 percent maximum. |
| Sulphur | 0.03 percent maximum. |
| Chromium | 15.00–16.00 percent. |
| Nickel | 4.00–5.00 percent |
| Molybdenum | 2.50–3.25 percent. |
| Nitrogen | 0.07–0.13 percent. |
| Iron | balance. |

While the stated precipitation hardenable alloys including AM355 stainless steel provide great strength at extreme environmental temperatures when used in fluid conduits or tubing, such materials are characterized by a loss of strength when heated excessively. Thus, for example, during a brazing operation to join workpiece materials of precipitation hardenable stainless steel in the hardened condition, the application of heat in an amount sufficient to melt the brazing alloy may cause annealing and consequent weakening of the conduit material in the absence of measures to control the intensity and the precise area of application of such heat. The application of brazing heat is of particular importance in connection with workpieces characterized by thin-walled or otherwise heat-sensitive nature wherein dissipation of brazing heat throughout the workpiece base metal may cause distortion in thin-walled sections.

Accordingly, it is a principal object of this invention to provide improved method and means for securing coupling components to adjacent separate sections of tubular conduits or the like.

It is a further object of this invention to provide improved method and means as set forth in these objects suitable for use on workpieces of thin-walled or otherwise heat-sensitive nature, especially where application of heat may produce distortion of the workpiece.

Other objects and advantages of the instant invention will become apparent upon a close reading of the following detailed description of an illustrative embodiment of the invention, reference being had to the accompanying drawings, wherein:

FIGURE 1 is a side elevational view, partly in cross-section, illustratively showing a coupling connection between two conduit sections, in the fabrication of which the method and apparatus disclosed in this case may advantageously be used, FIGURE 2 shows a general perspective view, partly broken away, of an illustrative embodiment of the apparatus disclosed herein for joining one portion of the coupling shown by FIGURE 1 to a conduit section, FIGURE 3 shows a modification of a portion of the apparatus shown in FIGURE 2 for securing the other main components of the coupling of FIGURE 1 to a conduit section, FIGURE 4 is a side elevational view, partly broken away, of the apparatus shown by FIGURE 2, and FIGURE 5 is a side elevational view, partly broken away, generally corresponding to FIGURE 4 but incorporating the apparatus modification shown by FIGURE 3.

With reference to the drawings described above, and particularly to FIGURE 1, the invention disclosed herein may be seen to relate to a tube or conduit coupling such as disclosed in patent application 325,999, a continuation-in-part of patent application 239,104, now abandoned, which was a continuation-in-part of patent application 850,423, filed November 2, 1959 by Robert J. Dawson, now abandoned, and including the embodiment illustratively shown by FIGURE 1 and generally designated by reference numeral 2 therein. Coupling 2 comprises a union fitting 4 having a bearing portion on the inner surface thereof adapted to contact the distal portion of a tube for conduit element 8. Coupling 2 further comprises a sleeve 10 having a bearing surface 12 adapted to make circumferential contact about a distal end of a conduit element 14. Sleeve 10 is further provided with an annular upstanding ridge 16 adapted to contact a radially inwardly projecting flange 18 on coupling nut 20. Coupling nut 20 has a plurality of helical threads 22 on the end thereof opposite flange 18 adapted to cooperate with oppositely corresponding helical threads 24 on an outer surface portion of union fitting 4. Union fitting 4 is further provided with a conically tapered surface 26 adapted to contact a convex annular flange-like projecting portion 28 on sleeve 10, forming therewith a fluid-type seal between conduit sections 8 and 14 when force is applied by rotation of coupling nut 20 to draw coupling components 4 and 10 tightly toward each other in the operative relationship shown by FIGURE 1.

Referring to FIGURE 2, it may be seen that union fitting 4 is further provided with an annular groove 30 in bearing surface 6 adapted to receive a ring 32 of suitable brazing alloy material. Thus, it will be understood that application of heat in the vicinity of ring 32 and sufficient to liquify the stated alloy material will form a bond permanently joining union fitting 4 to conduit 8 uniformly throughout bearing surface 6 of the fitting.

Means for applying the stated heat required for brazing are provided in the form of hollow induction brazing coil 34 which may comprise a plurality of turns of copper tubing adapted to receive electrical power from a suitable source as required for induction heating of metal. The novel brazing fixture disclosed herein, in addition to induction heating coil 34 may be seen to further comprise inerting means formed by an annular chamber 36 defined in part by cylindrical wall 38 which may be fabricated from Pyrex glass or suitable ceramic material. Wall 38 is adapted to contact closure means at either end thereof whereby chamber 36 completely isolates the brazing area from outside atmosphere and surrounds the stated area with a suitable inerting gas such as nitrogen. Thus, a split block 40 formed of two separable halves 42 and 44 adapted to contact each other along a plane of separation 46 is mounted on conduit section 8 at one end of chamber 36. Split block 40 is provided with an annular bearing surface 48 adapted to fit within cylindrical wall 38 and to support the same both radially and longitudinally. Inlet flow means for an inerting gas are provided in the form of a conduit 50 having its end contained within a hole of suitable size formed in split block 40 as shown in FIGURE 2. Gas supplied through conduit 50 is communicated to chamber 36 through an appropriate passage 52 on the inner surface 54 of block 50 and through a plurality of passages 56 communicating annular passage 52 with chamber 36.

The end of annular chamber wall 38 opposite from that contacted by split block 40 is adapted to be supported by a generally cylindrical shaped plug or cooling element 60 shown in FIGURE 2. Plug 60 is provided with an outer cylindrically shaped surface 62 adapted to fit snugly within the inner surface of cylindrical wall 38 with an annular radially outward projecting surface 64 in contact with the end of cylindrical wall 38, forming a sealing surface which isolates chamber 36 from outer surrounding atmosphere. Plug 60 is further provided with a substantially cylindrical surface 66 which is spaced radially inwardly from the inner surface of cylindrical wall 38 with the parts assembled in operative relationship as shown, for example, by FIGURE 4. A plurality of passages 68 are provided in plug 60 and communicate the area surrounding surface 66 with a passage 70 which is also provided in plug 60 and coaxial with the longitudinal axis thereof. Thus, inerting gas within chamber 36 may pass through passages 68 and 70 into the center of conduit section 8 during the brazing operation.

Plug 60 is further provided with a threaded bearing surface 72 having threads oppositely corresponding to threads 24 on union fitting 4 whereby plug 60 may be rotated to mount the same on union fitting 4 by interengagement of threads 24 and 72. In the stated relationship between plug 60 and union fitting 4 whereby their respective threads are completely interengaged, the relatively thin-walled distal edge portion 74 of union fitting 4 is bottomed within an annular cavity 76 formed in plug 60 and adapted to receive the same. Moreover, with plug 60 and union fitting 4 assembled in the stated relationship, conical tapered surface 26 on the union fitting is adapted to contact in oppositely corresponding tapered bearing surface 76 which is provided within plug 60 as shown by FIGURE 2. The end of plug 60 opposite that adapted to receive union fitting 4 as discussed above is provided with a hollow cavity 78 adapted to receive a cap member 80 having suitable bearing surfaces 82 and 84 for sealing contact with the end of plug 60 to make a fluid tight seal isolating cavity 78 from outer surrounding atmosphere. Cap member 80 is provided with suitable conduit connections 86 and 88 communicating with cavity 78 through passages 90 and 92 whereby a cooling fluid may flow into and out of cavity 78 from an external source (not shown). To enhance the cooling effect of the fluid within cavity 78, the inner walls of the cavity may be finned or otherwise machined to increase the surface area thereof as shown at 94 in FIGURE 2.

The structure shown by FIGURE 3 suggests the only changes necessary to adapt the fixture generally shown by FIGURE 2 for use in attaching sleeve 10 to conduit section 14 in precisely the same manner that union fitting 4 is attached to conduit section 8 as discussed above. Thus, sleeve 10 may be secured to conduit section 14 by use of a ring of brazing alloy 96 associated with bearing surface 12 in the same manner as ring 32 in respect of bearing surface 6 described above. Depending upon the size or relative mass of sleeve 10 compared with union fitting 4, coil 34 may be replaced by coil 96 having a construction generally similar to coil 34 but lesser number of turns. Instead of plug 60, a plug 100 serving the same general function as plug 60 but of slightly different shape is shown in FIGURE 3, from which it may be seen that a plurality of longitudinally projecting segments 102 are formed on plug 100 with bearing surfaces 104 having suitable size and shape for substantially uniform peripheral contact with convex annular flangelike projecting portions 28 of sleeve 10. A hollow cavity 106 provided in plug 100 functions in a manner and for a purpose identical to those discussed above in connection with cavity 78 in plug 60.

Referring to FIGURE 4, the precise operative relationship of parts discussed above in connection with FIGURE 2, when assembled as necessary to accomplish brazing of union fitting 4 on conduit 8 may be seen. In addition to the structure shown by FIGURE 2, FIGURE 4 also shows additional structure in the form of aligning fixture 110 which may comprise a base portion 112 integrally formed with the lower halves 114 and 116 of a split housing ring at either end of fixture 110. The upper halves 118 and 120 which are adapted to mate with lower portions 114 and 116, respectively, may be held in place by suitable holding screws such as indicated at 122 and 124. The structure shown by FIGURE 5 is precisely similar to that shown in FIGURE 4 except that plug 100 is substituted in place of plug 60 for brazing sleeve 10 to a conduit section instead of union fitting 4.

*Operation*

Although the apparatus disclosed herein may be used for application of heat to a variety of diverse materials, workpieces, and for different purposes, its operation need not in any case differ materially from that described below for the sake of illustration.

Prior to use of the apparatus for brazing, the workpiece components to which heat is to be applied by induction coils 34 or 96 must first be positioned in the desired final relationship. Thus, union fitting 4 is positioned on conduit 8 in the relationship shown by FIGURES 1 and 2, for example, with brazing ring 32 in place. With the workpiece components properly arranged as described above, split block 40 is positioned around conduit section 8 and cylindrical wall 38 is assembled in operative relationship on an annular bearing surface 48. Coil 34 may be positioned around cylindrical ball 38 and plug 60 may be rotated to engage threads 24 and 72 whereby the plug is mounted on union fitting 4 in the manner shown, for example, by FIGURE 4. Cap member 80 may then be fitted in place. After positioning of the fixture parts as described above, aligning fixture 110 may be assembled therewith by positioning housing ring portions 114, 116, 118 and 120 around either end thereof in the manner shown by FIGURE 4 and secured in place by holding screws 122 and 124.

Upon completion of the assembly procedures discussed above, inert gas may be supplied through conduit 50 and water may be supplied through conduit connection 86 whereby outlet water flow occurs through conduit connection 88.

Before application of brazing heat by coil 34 to the assembled workpiece components, a flow of suitable inert gas such as argon or nitrogen is established through conduit means 50 whereby oxidation and other adverse effects on the workpiece components which might otherwise occur in the heated state are avoided. Thus, for example, argon gas may be introduced through conduit 50 and passages 52 and 56 whereby filling chamber 36 and exiting therefrom through passages 68 and 70 and sends through conduit section 8. Flow of the inerting agent may be continuously maintained in the stated manner throughout the brazing operation. Such the inerting agent is usually at a relatively low temperature, the stated purging and inerting procedure will afford the additional advantage of cooling the workpiece components, especially those portions of union fitting 4 and conduit section 8 not aligned within coil 34, thus helping to avoid annealing of the material in the stated union fitting and conduit section which otherwise might occur at the high temperatures associated with brazing in most materials.

With the apparatus operatively related in the manner suggested by FIGURES 4 and 5, for example, and with inerting gas continuously flowing through chamber 36 while water is continuously flowed into cavity 78 through conduit 86 and out through conduit 88, brazing current may be applied to coil 34 to heat the workpiece areas proximate brazing ring 32. In brazing workpiece components of AM355 steel using standard silver-nickel brazing alloy, induction heating near ring 32 may produce a temperature close to 2000° F., whereas the temperature of union fitting 4 near thin-walled annular distal edge portion 74 may be less than 500° F. Thus, the cavity in plug 60 which is adapted to receive distal edge portion 74 of union fitting 4 contacts the stated workpiece portion substantially uniformly on both its inner and outer surface while tapered bearing surface 76 is firmly in contact with conical tapered surface 26 on the fitting. Thus, cooling fluid such as water continuously flowing through cavity 78 maintains the temperature of plug 60 at a relatively low value, whereby heat is effectively transferred out of union fitting 4 in those portions of the fitting having least mass and otherwise characterized by a definite propensity to distort in the presence of high heat such as would result from brazing by coil 34 in the absence of cooling effects derived from plug 60. It will be understood by those skilled in the art that operation of the apparatus as shown in FIGURES 3 and 5, for example, is substantially identical to that described above in connection with operation of the apparatus shown in FIGURES 2 and 4. The same advantages in controlling or containing the rate or path of heat dissipation in workpiece components 10 and 14 are achieved by plug 100 in a manner corresponding with those achieved by plug 60. Thus, convex annular flange-like projecting portion 28 on sleeve 10 is relatively thin-walled and would distort due to the application of brazing heat around ring 98 in the absence of means for cooling portion 28. Since portion 28 forms a sealing surface in the completed coupling 2 shown in FIGURE 1, any distortion in portion 28 will result in leakage through coupling 2 and would therefore be intolerable. Distortion of portion 28 is avoided in the instant case by close, continuous, and intimate contact between the surface of portion 28 and bearing surfaces 104 on segments 102 of plug 100. The continuous flow of cooling water through cavity 106 during the brazing operation results in rapid and efficient transfer of heat away from portion 28 whereby the temperatures of the workpiece material in sleeve 10 proximate portion 28 never approach a value at which distortion of such material may occur.

From the description of structure and its operation as set forth above and shown in the drawings, it may be seen that the invention disclosed herein provides novel means for applying heat such as required for brazing operation on workpiece components having thin-walled or otherwise heat-sensitive portions thereof which distort in the presence of high temperatures. The flow path of purging and inerting gas through conduit 50, chamber 36 and passages in plug 60 as indicated by FIGURE 4, for example, result in maximum utilization of the cooling properties of the gas being realized. Also, oxidation and annealing effects which would otherwise occur within conduit 8 are avoided by conducting the purging and inerting gas flow continuously through the conduit section. The relatively lightweight construction and arrangement of component parts in the brazing fixtures shown, for example, in FIGURES 4 and 5 result in rapid dissipation of brazing heat whereby the continued application of residual heat following the brazing operation does not produce widespread annealing of workpiece components, or consequent weakening of the brazed joint.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

I claim:

1. In apparatus for applying heat to localized areas of a hollow workpiece having a relatively thin-walled unsupported distal edge portion tending to distort in the presence of said heat, the combination of:

inerting gas flow means including chamber means for enclosing said areas and flowing inerting gas completely around said areas, said chamber means including plug means forming a wall portion of said chamber, said plug means having a bearing cavity adapted to receive said unsupported distal edge portion and to make substantially uniform contact with the surfaces of said edge portion, said plug means further having cooling cavity means for containing cooling fluid to lower the temperature of said plug in the presence of said heat, and induction coil means for applying said heat to said workpiece.

2. The structure set forth in claim 1 above, including in addition thereto:

passage means communicating said chamber means with the hollow interior of said workpiece, whereby said inerting gas flows into said hollow interior.

3. The structure set forth in claim 2 above, including in addition thereto:

a plurality of upstanding flange-like projections on the surrounding walls of said cooling cavity for increasing the cooling capacity thereof.

4. In apparatus for brazing a coupling component having a relatively thin-walled distal end portion to an end of a generally cylindrical hollow conduit, the combination of:

closed chamber means including a chamber wall for encircling the portion of said coupling component and said conduit to be joined by said brazing operation, gas flow means for supplying an inert gas to said chamber continuously during said brazing operation, said chamber means further including plug means at one end thereof, said plug means having a bearing surface adapted to make substantially uniform contact with said distal end portion throughout substantially the entire surface area of said distal end portion and to cool said distal end portion, and induction coil means including an induction coil adapted to surround said portion of said coupling component and said conduit to be joined by said brazing operation, and to cause heating of last said portion in an amount sufficient to braze the same.

5. The method of brazing a first workpiece component having a relatively thin-walled distal end portion to a second workpiece component, said method comprising:

enclosing both said workpiece components within a chamber having a heat-transferring hollow plug forming a wall portion of said chamber, placing an induction coil around said first and second workpiece components in generally concentric alignment with the braze area, contacting said plug against said first workpiece component in substantially uniform surface contact with said distal end portion, cooling said plug by a flow of cooling fluid through said hollow plug, and applying heat to said braze area by energizing said coil.

References Cited by the Examiner
UNITED STATES PATENTS

| | | |
|---|---|---|
| 1,615,591 | 1/27 | Mallory. |
| 3,085,141 | 4/63 | Rossner _____ 219—9.5 |
| 3,093,719 | 6/63 | Miller _____ 219—9.5 |
| 3,101,400 | 8/63 | Gagliardi _____ 219—10.43 |
| 3,102,180 | 8/63 | McCullough et al. _____ 219—9.5 |
| 3,110,793 | 11/63 | Worthington _____ 219—9.5 |

RICHARD M. WOOD, *Primary Examiner.*
JOSEPH V. TRUHE, SR., *Examiner.*